United States Patent
Rodriguez

(10) Patent No.: US 11,622,639 B2
(45) Date of Patent: Apr. 11, 2023

(54) ADJUSTABLE HANGER APPARATUS AND METHOD

(71) Applicant: Alan Rodriguez, Dallas, TX (US)

(72) Inventor: Alan Rodriguez, Dallas, TX (US)

( * ) Notice: Subject to any disclaimer, the term of this patent is extended or adjusted under 35 U.S.C. 154(b) by 0 days.

(21) Appl. No.: 17/348,331

(22) Filed: Jun. 15, 2021

(65) Prior Publication Data

US 2021/0393055 A1   Dec. 23, 2021

Related U.S. Application Data

(60) Provisional application No. 63/040,256, filed on Jun. 17, 2020.

(51) Int. Cl.
| | | |
|---|---|---|
| *A47G 1/20* | (2006.01) | |
| *F16B 45/00* | (2006.01) | |
| *A47G 1/16* | (2006.01) | |

(52) U.S. Cl.
CPC ............ *A47G 1/202* (2013.01); *F16B 45/00* (2013.01); *A47G 1/1686* (2013.01)

(58) Field of Classification Search
CPC ........ A47G 1/202; A47G 1/1686; F16B 45/00
See application file for complete search history.

(56) References Cited

U.S. PATENT DOCUMENTS

| | | |
|---|---|---|
| 1,887,031 A | 11/1932 | Lyon |
| 4,566,665 A | 1/1986 | Rynearson |
| 4,892,284 A | 1/1990 | Kelrick |
| 4,973,021 A | 11/1990 | Schuite |
| 5,584,462 A * | 12/1996 | Reese ............... A47G 1/202 248/339 |
| 5,611,189 A | 3/1997 | Fleck |
| 6,053,468 A | 4/2000 | Francis |
| 6,557,813 B1 * | 5/2003 | Duggan ............ A47G 1/1613 248/495 |
| 7,497,411 B2 * | 3/2009 | Week ................ A47G 1/202 248/495 |
| 7,762,517 B1 | 7/2010 | Leseman |
| 8,899,541 B2 * | 12/2014 | Bixler ............... A47G 1/164 40/748 |
| 2003/0029986 A1 | 2/2003 | Zuller |
| 2015/0272353 A1 * | 10/2015 | Christodoulou ....... A47G 1/202 29/525.01 |

OTHER PUBLICATIONS

International Search Report issued for PCT/US2021/037601 dated Oct. 6, 2021.

* cited by examiner

*Primary Examiner* — Anita M King
(74) *Attorney, Agent, or Firm* — Gregory Perrone; Bobby W. Braxton; Braxton Perrone, PLLC

(57) ABSTRACT

An adjustable hanger assembly having a fixed holder base mountable to a substantially planar structure such as a wall and a movable hook assembly slidably insertable into a cavity within the fixed holder base A actuator disposed in the fixed holder base in contact with the movable hook assembly causes the movable hook to move upward or downward in relation to the fixed holder base to a desired position of an item for hanging.

17 Claims, 5 Drawing Sheets

ADJUSTABLE HANGER APPARATUS AND METHOD

CLAIM OF PRIORITY

This application claims priority of U.S. Provisional Patent Application No. 63/040,256 filed Jun. 17, 2020, which is incorporated herein in its entirety by reference.

TECHNICAL FIELD

This disclosure relates generally to an adjustable hanger apparatus and method and specifically to an apparatus and method for more efficient and precise hanging of items such as picture frames on a substantially planar surface such as a vertical wall.

BACKGROUND

Oftentimes, when it is desired to secure an object, such as a picture object, or frame, an advertising object, or some form of art, at a selected location on a surface, such as a wall, one or more pieces of small- to medium-sized hardware are utilized. In some cases, a common nail can be used, hammered into a wall at a selected location and sometimes angled, downwardly, relative thereto such that the distal end of the nail will extend outward and upward once the nail is in place.

Slightly more complex than a common nail, various off-the-shelf special-purpose hardware devices are commercially available. Typically, these can comprise something in the nature of a nail or nail-like portion, integral with, or connectable in some manner to, an upward and outwardly extending hook portion. For example, such hardware often comprises a nail that passes through a sleeve integral with the hook. The hook is held against a surface of a wall at a desired height. Conveniently, the hook is operable to automatically align the nail at an optimum angle. The nail portion, with the accompanying hook portion, is hammered into a wall similar to the foregoing nail-only solution. This integrated hook and nail design is meant to provide some ease in installation in terms of allowing the installer to use one hand to hold the hook and nail combination in place while pounding the nail into the wall with a hammer.

Rather than utilizing the distal end of the nail as a hook, the specific movable hook apparatus portion of the device is used for hanging or attaching the object, such as a picture object, or frame, an advertising object, or some form of art, at a selected location proximate the surface of the wall. The Object, as in the case of picture frames, often includes a hanging wire attached across the back of the frame at or above the approximate vertical center of the back of the frame. The frame's hanging wire is slipped onto the angled hook or the angled nail to secure the frame to the wall.

There are also other means known that can sit or rest on the nail or hook to support an object, such as a picture object, or frame, an advertising object, or some form of art, in place. In some instances, for example, one or more holes, channels, keyholes, D-rings, sawtooth hangers, or the like are formed into or on the object material itself. Each of these securing means fit over or on the distal end of a nail or hook.

For small-to-midsized objects such as picture frames, which typically are not particularly heavy, only a single nail or piece of special-purpose hardware, often referred to as a hanger or hook, is employed. With large to very-large objects, however, which can be heavy and tend to unduly stress just a single nail or special-purpose hanger, a plurality of nails or hangers are often utilized. These multiple nails or hooks, for example, are placed on the wall at spaced-apart locations along the upper margin of the back of the object, e.g., towards each lateral side of the object, and sometimes at its central region, as well.

Generally, screws can provide more holding power than nails, and depending on the applicant can be preferable for hanging large, heavy objects. A screw, however, presents different issues, particularly when hanging a frame on a drywall wall. A drywall wall usually is supported by studs located sixteen inches apart from the center of each stud. Thus, when using a screw as the hangar, the drywall does not provide sufficient support for the screw as the drywall material itself is insufficient to securely grip the threads of the screw. Thus, when hanging an object between studs with a screw, a hollow-wall anchor should be used, such as a toggle bolt, molly bolt, or spiral anchor. A spiral anchor is generally considered among the easier of such devices to install, as it can simply be driven into the wall with a screwdriver, and then a screw can be driven into the anchor. Notably, some commercially available spiral anchors include special picture-hanging hooks and some commercially available hangers include an adhesive strip to mount a hook to a wall. In the alternative, the screw can be inserted directly into the stud, which is often made of wood. The problem with this method is that the stud may be at a location that is not a desirable location for the frame.

Although not all that complex, several problems are commonly associated with hanging an object in the ways described above. For example, such problems can include one or more of: (i) hanging the object, securely so it doesn't fall; (ii) pinpointing the nail location so the object hangs with sufficient precision at the desired location; (iii) hanging the object level with the horizon, with sufficient precision; and (iv) wasting adhesive strips that are placed in the wrong position and need to be removed.

Unacceptable errors made with any one or more of the foregoing potential problems can require removal of the problematically and incorrectly placed nail or hanger, and a reattempt. Sometimes multiple rounds are required before satisfactory results are achieved. This can be time-consuming, as well as damaging to the selected surface(s), depending upon the number of repeated attempts required before success is achieved. This can also require special equipment, such as a stud finder or a level.

Further, the task of object hanging with the above devices and methods can prove to be very frustrating, especially for nonprofessionals, such as homeowners or renters that perform the task only infrequently, for example, as a do-it-yourself (DIY) home-improvement project. Despite the above-mentioned problems, as they have been for countless years, the above-described apparatus and methods of hanging objects continue to this day, to be the most popular and widely used.

The problems associated with hanging a single frame are exacerbated when hanging multiple frames in close proximity to each other. As is common, a person might wish to arrange several frames in a particular alignment. Often, if two or more frames are to be arranged together, the person wishes for the top edges or side edges of the frames to be in precise alignment. For the DIYer, this is a very difficult and frustrating task requiring much trial and error that results in time wasted and damage to the wall surface.

Existing attempted solutions have their shortcomings. One commercially available product for hanging objects which is quite different from the above described apparatus and methods, is sold by Designs 4 Life LLC under the registered trademark PICTURE PERFECT HANGER®, marked with U.S. Pat. No. 8,376,308 B2 to Greve', issued Feb. 19, 2013. Such products are available via the internet url: http://pictureperfecthanger.com/.

Hanging multiple objects at precisely the same elevation is further complicated by those objects that are equipped with a wire on the back. These wires are very rarely the same length from object to object and have different levels of tension. Similar frames having dissimilar wires or hanger locations is more problematic as even use of a level doesn't resolve the problem of differences in wire length or tension. Tape measures, laser levels and the like are insufficient to easily hang the objects at the same elevation, if at all.

What is needed is an apparatus and method for attachment of a holder base at a precise elevation that is adjustable by the user after installation, allowing the user to manipulate a movable hook apparatus within the fixed holder base. This can be accomplished without having to remove the fixed holder base attached to the wall.

BRIEF DESCRIPTION OF THE DRAWINGS

The novel features believed characteristic of the invention are set forth in the appended claims. The invention itself, however, as well as a preferred mode of use, further objectives and advantages thereof, will be best understood by reference to the following detailed description of illustrative embodiments when read in conjunction with the accompanying drawings and photographs, wherein:

DETAILED DESCRIPTION OF THE EMBODIMENTS

Figure 1A:
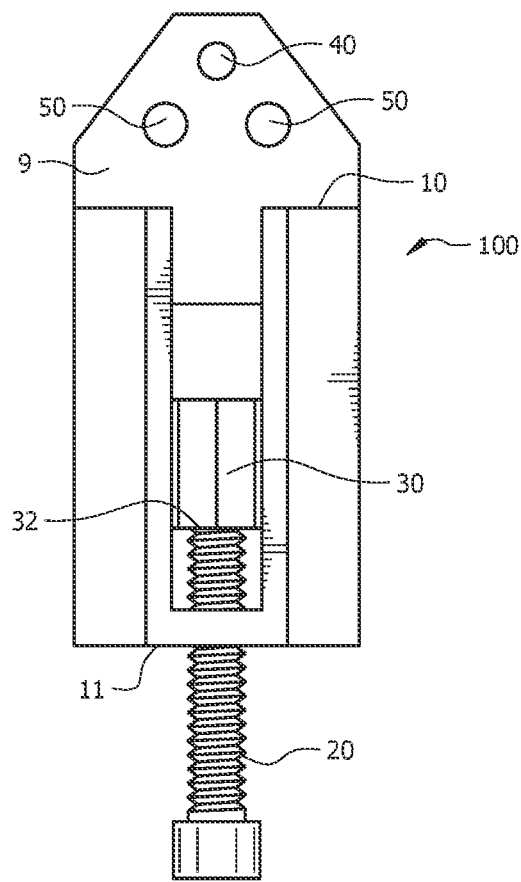
FIG. 1A is a front view of an adjustable hanger assembly according to an embodiment of the present invention.

The detailed description set forth below is intended as a description of the present embodiments of the invention, and is not intended to represent the only form in which the present invention may be constructed or utilized. The description sets forth the functions and sequences of steps for constructing and operating the invention. It is to be understood, however, that the same or equivalent functions and sequences may be accomplished by different embodiments and that they are also intended to be encompassed within the scope of the invention.

Several embodiments of Applicant's invention will now be described with reference to the drawings. Unless otherwise noted, like elements will be identified by identical numbers throughout all figures. The invention illustratively disclosed herein suitably may be practiced in the absence of any element which is not specifically disclosed herein.

According to various embodiments, the present invention provides an adjustable hanger assembly, comprising a movable hook apparatus, a fixed holder base, and an actuator. The movable hook apparatus comprises a top end, a bottom end, a back wall, extending from the top end to the bottom end, a front wall extending from a point at or near the top end to a point at or near the bottom end, two side walls (left and right) extending from a point at or near the top of the back wall, a hook, or attachment device, integrated into the front wall of the movable hook apparatus.

The front wall of the movable hook apparatus is stepped at various points, providing a low profile at its horizontal ends and a high profile in the middle of the front face that includes the hook. The low profiles set to allow for slidable attachment of the movable hook within the vertical cavity portion of the fixed holder base. In one embodiment, the hook is formed integrally within the movable hook apparatus or, in the alternative, as an attachment thereto.

The fixed holder base comprises a top end, a back end with a cavity extending outwardly, such cavity having a bottom, a right side, a left side, and a front, such front being the ultimate front portion of the fixed holder base. Such cavity slidingly engages the movable hook apparatus, the movement of the movable hook apparatus in an up, down, left, and right direction, thereby supporting such movable hook apparatus.

The front portion of the cavity further comprising a solid portion at the bottom with an aperture for engagement of an with such solid portion of the bottom of the movable hook apparatus and further to access to the cavity.

This fixed holder base front having an open slot for the hook portion of the movable hook apparatus to extend outwardly through the front slot when the movable hook apparatus is inserted into said cavity and caused to slide up or down by the actuator.

An actuator, such as a screw, shim, bolt, a graduated clip with spring-like qualities, for holding the weight of the object at various selected vertical position(s) as required.

According to one embodiment, a fixed holder base and a movable hook apparatus is further disclosed that allows the movable hook apparatus to be adjusted vertically and horizontally within the fixed holder base and held in a vertical and horizontal position by an engagement with the fixed holder base. In the adjustable hanger assembly the adjustable height of the movable hook apparatus is accomplished after the fixed holder base is hung, or attached to the vertical surface, or wall.

The adjustable height of the movable hook apparatus is adjustable to any level or position within the total range allowable, from low to high, of the range of the fixed holder base without the need for vertical adjustment in pre-determined steps.

The hook portion of the movable hook apparatus can be of multiple hook designs. The scaling of the dimensions of each component for various applications can be utilized to create a range of product models by weight-carrying capacities. The adjustable height of the movable hook apparatus is accomplished without needing to move the fixed holder base. Further, the adjustable height of the movable hook apparatus is adequate for hiding the nail, hook, hanger or attachment device to the wall. In some embodiments, the adjustable height of the movable hook apparatus is determined by a screw type version of actuator. In other embodiments, the adjustable height of the movable hook apparatus is determined by a spring clip version of actuator.

In some embodiments, the adjustable lateral position of the movable hook apparatus is determined by multiple guides in the fixed holder base and corresponding slots in the movable hook assembly for horizontal adjustments. The adjustable lateral position of the movable hook apparatus is determined by multiple slots in the fixed holder base and corresponding guides in the movable hook assembly for horizontal adjustments.

The adjustable height of the movable hook apparatus can be made as object cables sag without removing the object that is hanging from the wall. The adjustable height of the movable hook apparatus can be made as cables sag without repositioning the fixed holder.

In some embodiments, multiple extra holes are provided so when utilized, the holder base cannot swing to an angle other than that in which it was originally positioned. Multiple extra holes are provided so the fixed holder base can be held to an angle chosen by utilizing certain of the additional holes. The multiple extra holes are provided so a multiple number of extra holes can be used simply to increase overall weight-carrying capacity of the adjustable hanger assembly.

The multiple extra holes are provided so a multiple number of extra holes can be used to account for fragile wall material that has minimal holding strength per adjustable hanger assembly used for ultimate weight carrying capacity.

Nails or hooks are used for attachment of the fixed holder base to a wall. In the alternative, hook and loop fasteners are used for attachment of the fixed holder base to a wall or Command fasteners may be used for attachment of the fixed holder base to a wall. In the alternative, adhesive strips or glue is used for attachment of the fixed holder base to a wall. The adjustable hanger assembly of claim 1 wherein the use of glue is used for attachment of the fixed holder base to a wall.

The movable hook apparatus and the fixed holder base comprise plastic material and the spring comprises a metal material. In the alternative, the movable hook apparatus and the fixed holder base comprise a combination of plastic material and metal material.

In one embodiment, the fixed holder base has a top edge, the movable hook apparatus has a top edge, the movable hook apparatus is engaged in the fixed holder base, the adjustable hanger assembly is mounted on a wall, and the top edge of the movable hook apparatus is above the top edge of the fixed holder base. The movable hook apparatus front wall has an outer surface and a hanger formed on the outer surface. In one embodiment, the hanger is in the form of a hook.

The presently described adjustable hanger assembly comprises, in one embodiment, a fixed holder base and a movable hook apparatus that allows the movable hook apparatus to be adjusted vertically within the fixed holder base and horizontally along a wall mounting bracket and held in a vertical and horizontal position by an engagement within the fixed holder base and horizontally along a wall bracket.

Additionally, in some embodiments a security element is included to inhibit theft of the object such as a safety hook, security hook, or earthquake hook, element, molded, welded, glued, snapped in place, or otherwise incorporated into the adjustable hanger assembly.

The adjustable height of the movable hook apparatus is accomplished after the fixed holder base is hung or attached to the vertical surface or wall.

The adjustable height of the movable hook apparatus is adjustable to many positions within the total range allowable, from low to high, of the range of the fixed holder base without the need for vertical adjustment in pre-determined steps.

The hook portion of the movable hook apparatus comprises multiple hook designs. The dimensions of each component are scalable for various applications to create a range of product models by weight-carrying capacities.

The adjustable height of the movable hook apparatus is accomplished without movement of repositioning of the fixed holder base. The adjustable height of the movable hook apparatus is adequate for hiding the nail, hook, hanger or attachment device to the wall.

In some embodiments, the adjustable height of the movable hook apparatus is determined by a screw-type version of actuator. In some embodiments, the adjustable height of the movable hook apparatus is determined by a spring-clip version of actuator.

The height of the movable hook apparatus is adjusted as object cables sag without removing the object that is hanging from the wall. The adjustable height of the movable hook apparatus can be made as cables sag without repositioning the fixed holder.

In some embodiments, multiple mount holes are provided so the fixed holder base is held to an angle chosen by utilizing certain of the additional holes. Also, multiple extra holes are provided to increase overall weight carrying capacity of the adjustable hanger assembly.

In some embodiments, the movable hook apparatus and the fixed holder base comprise plastic material and the spring comprises a metal material. In some embodiments, the movable hook apparatus and the fixed holder base comprise a combination of plastic material and metal material.

In some embodiments, the hanger is in the form of a hook. The fixed holder base and a movable hook apparatus provide a low-profile assembly for hanging objects close to a wall.

A referenced devices alone or in combination attach to a wall horizontally, allowing for a string, wire, monofilament line or similar product to be looped through the movable hook apparatus of each apparatus device and thereby tensioned by the actuators on each apparatus device to establish a taut line. The taut line then suspends objects at various points along the horizontal line that is thereby created.

A method for mounting a fixed holder base on a wall and then engaging a movable hook apparatus within the fixed holder base is also described. The method comprises mounting the fixed holder base can include first mounting a mounting bracket, as simple as a nail, on a wall and then engaging the fixed holder base with the mounting bracket. Once mounted, the fixed holder base enables adjustment of the movable hook apparatus in both vertical and horizontal directions without having to remove the fixed holder base from its mounted position.

A fixed holder base and a movable hook apparatus that allows the movable hook apparatus to be adjusted vertically within the fixed holder base, and horizontally with the use of a bracket and held in a vertical and horizontal position by an engagement with the fixed holder base.

Figure 1D:
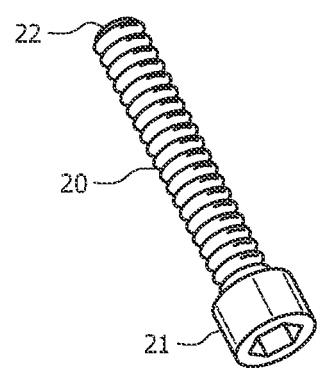
FIG. 1D is a perspective view of an actuator used in an adjustable hanger assembly according to an embodiment of the present invention.
Figure 2A:
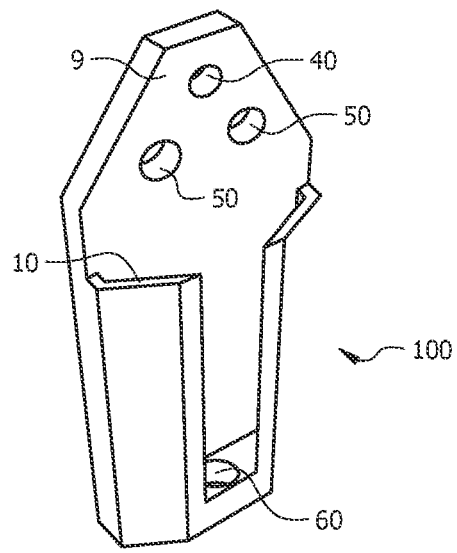
FIG. 2A is a perspective view of a fixed holder base portion of an adjustable hanger assembly according to an embodiment of the present invention.

FIG. 1A is a front view of an adjustable hanger assembly according to an embodiment of the present invention. In FIG. 1A, adjustable hanger assembly 100 comprises a base 9 having a base cavity 10, an adjustable hook 30 and actuator 20. Adjustable hook 30 in one embodiment is an elongated member that conforms to the contours and profile of base cavity 10. The correspondence in size, shape and profile between adjustable hook 30 and base cavity 10 provides for adjustable hook 30 to be slidably inserted and engaged into base cavity 10. As shown, actuator 20 is inserted into actuator aperture 60 (FIGS. 2A and 2C). In one embodiment, actuator 20 is a threaded bolt having a head for receipt of a tool such as a hex wrench or the like. As such, actuator aperture 60 in lower side 11 of base 9 is threaded to conform to the threads of actuator 20. The distal end 22 of actuator 20 (FIG. 1D) contacts the lower end 32 of adjustable hook so as to effect slidable movement of adjustable hook 30 within base cavity 10.

Also shown in FIG. 1A are mount holes 40 and 50. Mount holes 40 and 50 in one embodiment are sized to receive mounting fasteners of varying diameters.

Figure 1B:
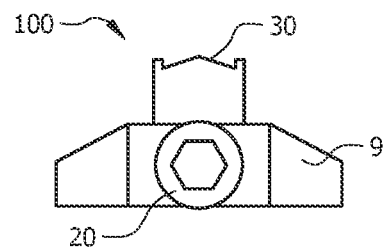
FIG. 1B is a bottom view of an adjustable hanger assembly according to an embodiment of the present invention.

FIG. 1B is a bottom view of an adjustable hanger assembly according to an embodiment of the present invention. In FIG. 1B, the head of actuator 20 is shown along with adjustable hook 30 engaged within base 9.

Figure 1C:
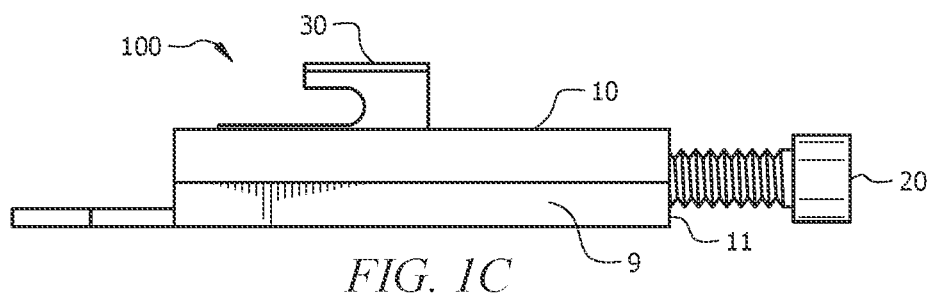
FIG. 1C is a left side view of an adjustable hanger assembly according to an embodiment of the present invention.
Figure 3A:
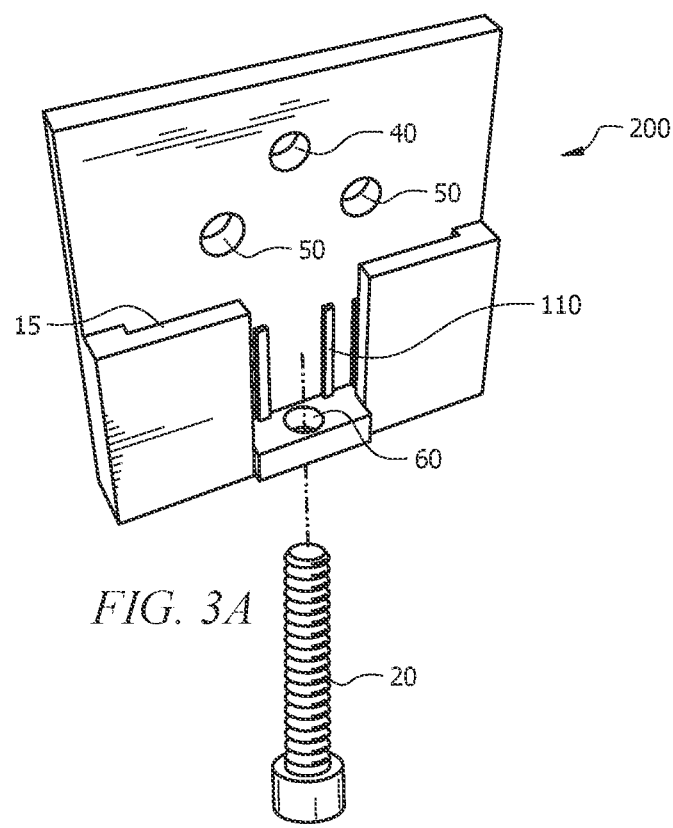
FIG. 3A is a perspective view of a fixed holder base according to an embodiment of the present invention.

FIG. 3A 1C is a left side view of an adjustable hanger assembly according to an embodiment of the present invention. In FIG. 1C, again adjustable hook 30 is engaged within base cavity 10 of base 9, with actuator 20 entering the lower side 11 of base 9.

Figure 4A:
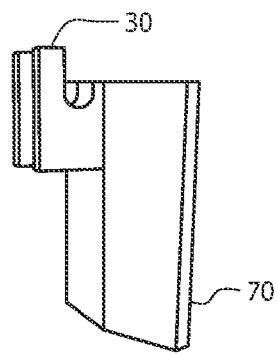
FIG. 4A is a perspective view of a movable hook apparatus according to an embodiment of the present invention.

FIG. 4A 1D is a perspective view of an actuator used in an adjustable hanger assembly according to an embodiment of the present invention. As shown, actuator 20 includes a distal end 22 that comes into contact and effects movement of adjustable hook 30 and a head 21. In one embodiment, actuator 20 is a threaded bolt having a head that receives a tool such as a hex wrench.

FIGS. 2A-2E depict alternate views of adjustable hanger assembly 100. FIG. 1B 2A is an angled view of base 9 with base cavity 10, which receives adjustable hook assembly 70 of FIG. 2B having adjustable hook 30. As can be seen in FIG. 2A, base cavity 10 in one embodiment is of a tapered design from side to side. Base 9 also includes mounting holes 40 and 50 for mounting base 9 to a wall or similar structure securely and in a stationary manner of the present invention.

Figure 2B:
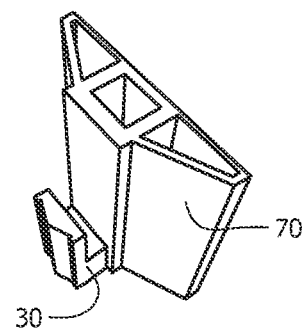
FIG. 2B is a perspective view of a movable hook of an adjustable hanger assembly according to an embodiment of the present invention.
Figure 2C:
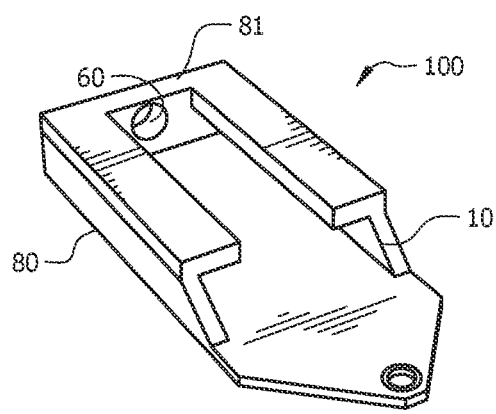
FIG. 2C is a perspective front view of an adjustable hanger assembly according to an embodiment of the present invention.

FIG. 2B is an angled view of a movable hook of an adjustable hanger assembly 100 according to an embodiment of the present invention. As shown, adjustable hook assembly 70 includes adjustable hook 30. Adjustable hook assembly 70 is, in one embodiment, tapered as it is progressively narrower from center to sides. This tapered structured conforms to the corresponding tapered profile of base cavity 10 for slidably receiving adjustable hook assembly 70.

Figure 3B:
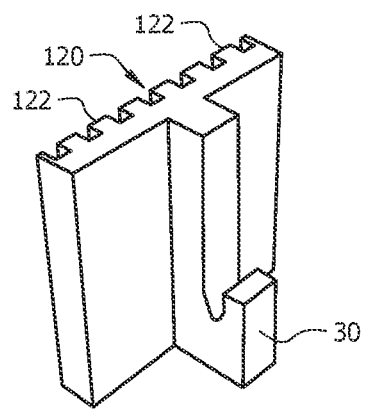
FIG. 3B is a front perspective of a horizontally movable hook of an adjustable hanger assembly according to an embodiment of the present invention.

FIG. 3B 2C is an angled front view of an adjustable hanger assembly 100 according to an embodiment of the present invention. FIG. 2C is another embodiment of adjustable hanger assembly 100 in which the profile of base cavity 10 is rectangular as opposed to tapered as shown in FIG. 2A. Like FIG. 2A, rectangular fixed holder base 80 has a profile to slidably receive a adjustable hook assembly. In the embodiment of FIG. 2C, however, the corresponding adjustable hook assembly has a rectangular profile. In addition, like the base 9 in FIG. 2A, rectangular fixed holder base 80 comprises aperture hole 60 in the lower side 81.

Figure 2D:
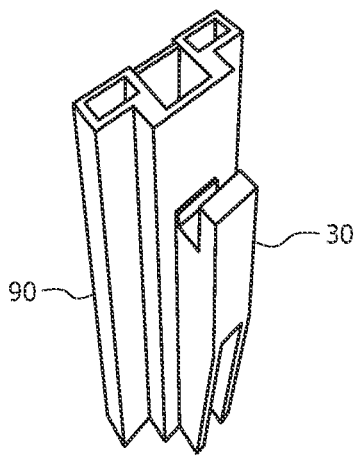
FIG. 2D is a perspective view of a long version of a movable hook according to an embodiment of the present invention.
Figure 4B:
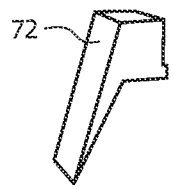
FIG. 4B is a perspective view of safety hook, security hook or earthquake hook latch according to an embodiment of the present invention.

FIG. 4B 2D is an angled view of a long version of a movable hook according to an embodiment of the present invention having a rectangular profile. As shown, hook 30 resides on elongated rectangular adjustable hook assembly 90 that is slidably received by the base recess 10 rectangular fixed holder base 80 of FIG. 2C.

Figure 2E:
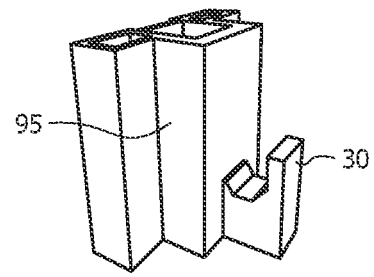
FIG. 2E is a perspective view of a movable hook of an adjustable hanger assembly according to an embodiment of the present invention.

FIG. 5B 2E is an angled view of a movable hook of an adjustable hanger assembly according to an embodiment of the present invention. Similar to FIG. 2D, FIG. 2E depicts another embodiment of adjustable hanger assembly 100 in which a shortened rectangular adjustable hook assembly 95 is provided having hook 30. As in FIG. 2D, shortened rectangular adjustable hook assembly 95 has a rectangular profile for slidable insertion into the by the base recess 10 rectangular fixed holder base 80 of FIG. 2C.

FIG. 1C 3A is an angled view of a fixed holder base according to an embodiment of the present invention. In the embodiment of FIG. 3A, adjustable hanger assembly 200 is configured to accommodate adjustment of the hook in a horizontal direction. As shown, adjustable hook assembly 200 comprises base 14 having base cavity 15. Note that base cavity in this horizontally adjustable assembly is elongated laterally to permit side to side movement of hook 30. In the upper section of adjustable hook assembly 200 are one or more mounting holes 40 and 50 that are uniform in diameter or different in diameter to accommodate different sized mounting nails or screws. The lower end of base 15 includes aperture 60 that accommodates actuator 20. In one embodiment, aperture 60 is threaded for receipt of a threaded actuator 20, which can be a screw or bolt.

Figure 3C:
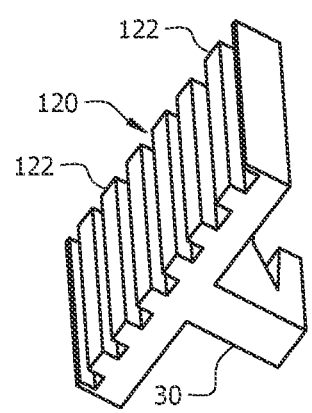
FIG. 3C is a rear a perspective view of a horizontally and vertically movable hook apparatus according to an embodiment of the present invention.

FIG. 2C 3B is a perspective view of a horizontally movable hook of an adjustable hanger assembly according to an embodiment of the present invention. FIG. 3B provides an embodiment of adjustable hook assembly 120 for horizontal adjustment. Note that in the embodiment of FIG. 3B, adjustable hook assembly 120 includes one or more grooves or ridges 122 that run vertically along the interior side of hook assembly 120, as shown in FIG. 3C. These grooves or ridges will mate with corresponding ridges within base cavity 15 in base 14 to permit measured adjustment of adjustable hook assembly 120 within base cavity 15. At the same time, actuator 20 permits vertical adjustment of adjustable hook assembly 120 in similar fashion as shown in connection with previously discussed embodiments.

Figure 5:
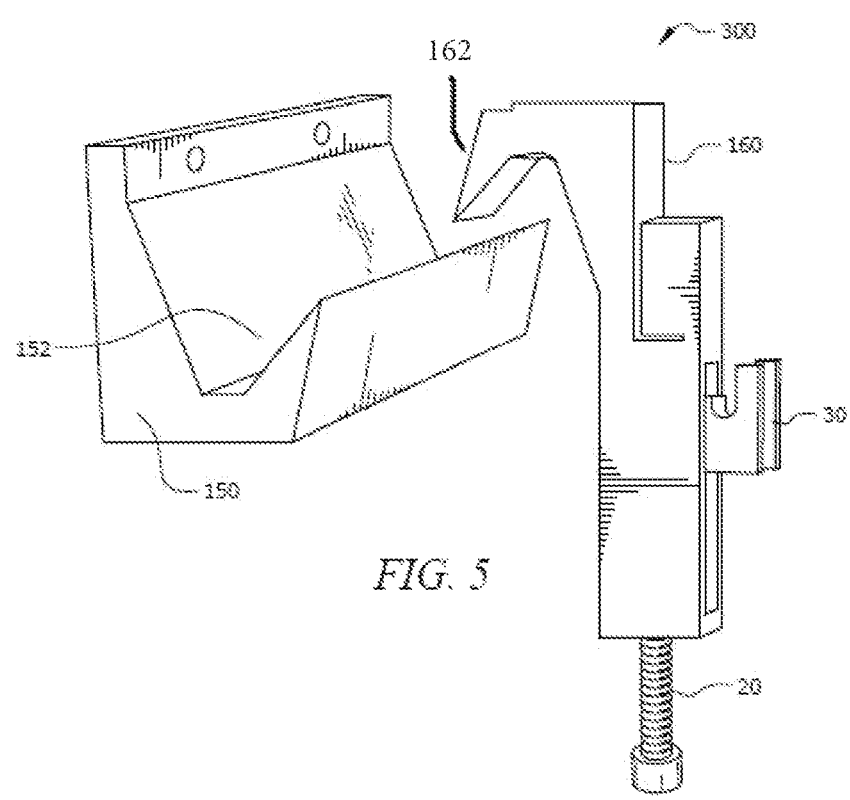
FIG. 5 is a perspective view of an embodiment of an adjustable hanger apparatus according to an embodiment of the present invention.

FIG. 5 depicts an embodiment of horizontally and vertically movable hook apparatus according to an embodiment of the present invention. As shown, base 150 comprises a substantially v-shaped channel 152 that runs the width of base 150. Adjustable hook assembly 160 includes a corresponding v-shaped void and downward hook 162 that is received by v-shaped channel 152. In this embodiment, adjustable hook assembly 160 includes a hook cavity that receives hook 30 that is slidably inserted into the hook cavity. Actuator 20, as with previously discussed embodiments, is rotated in a clockwise or counterclockwise direction causing the hook 30 within the hook cavity to move up or down according to a desired height of the hook. At the same time, actuator 20 serves as a handle to permit ease of movement of adjustable hook assembly 160 within channel 152 of base 150 in a leftward or rightward direction, according to the desired location of the hook.

In use, once a picture frame having a wire hanging device as discussed is placed over hook 30, the user can easily reach behind the frame, while it remains hanging, to turn the actuator 30 in a clockwise or counterclockwise direction causing hook to move vertically. At the same time, the user can easily reach behind the frame to move adjustable hook assembly left or right within channel 152. These two ranges of motion provide precise location of the frame after just a single installation of the adjustable hanger assembly base onto the wall surface, eliminating the known trial and error technique that requires repeated removal and reinstallation of the hook that wastes time and causes wall damage.

Operation of the adjustable hanger assembly according to an embodiment will be described with reference to the embodiment of FIGS. 1A-1D and 2A-2E. In operation, fixed holder base 9 of FIG. 1A is attached at an appropriate wall or other structure location utilizing a nail, hook, screw, glue, adhesive, loop fastener or some combination of a variety of fasteners. The movable hook assembly, such as 70 of FIG. 2B is then slidingly engaged in a corresponding fixed holder base cavity 10 of FIG. 1A and FIG. 2A. and in compression with the actuator 20 and with hook (30) extending outwardly. Hook 30 receives the hanging means attached to the back of the frame, such as a wire or the like.

The movable hook assembly 70 of FIG. 2B is configured with the hook portion 30 extending outwardly in order to accept the attachment wire, D ring, hook or other attachment mechanism in use by the object, or frame. The movable hook assembly 70 is configured so as when slidably inserted into base cavity 10 (FIG. 2A) of the fixed holder base 9 (FIG. 2A) to be in compression contact with the actuator 20 (FIG. 1D) and to enable the movable hook assembly to move up and down within the base cavity 10 as the actuator 20 is manipulated, and thus the height of the movable hook apparatus is adjusted with respect to the fixed holder base.

Alternative configurations are also within the realm of the present invention and include such differences as having a plurality of actuators and holes for wall attachment of the fixed holder base. In other embodiments, a single wide base has multiple base cavities to receive multiple adjustable hook assemblies. This configuration is desirable to accommodate hanging items of considerable weight.

The relative height of the object, when the fixed holder base is mounted on a wall, and in receipt of the adjustable hook assembly, can therefore be adjusted with respect to the fixed holder base.

According to various embodiments of the present invention, the fixed holder base can have a back face. The fixed holder base back face has an inner surface and an outer surface. The outer surface of the back face having one or more of many adhesives or other materials or devices to attach it to the wall, optionally, in conjunction with a nail or nails utilized through the provided holes.

According to various embodiments of the present invention, the fixed holder base back face has an inner surface and an outer surface. The inner surface can be partially provided with vertical grooves or ridges 110 (FIG. 3A) 110 in or on the inner surface. The grooves, or ridges, are designed to engage with the grooves or ridges 122 in or on the back face of the adjustable hook assembly 120 of FIGS. 3B and 3C.

The grooves or ridges on an inner surface of the back of a fixed holder base are matably connected with the grooves or ridges in the movable hook assembly, thereby rendering a horizontal adjustment of the position of the movable hook assembly as multiple horizontal engagement variations are possible.

The adjustable hanger assembly also in one embodiment comprises an adjustable hanger assembly 300 mounting bracket of FIG. 5 configured to be fixedly secured to a wall and comprising one or more horizontal angled receiving grooves for receiving one or more grooves or ridges, 160 of FIG. 5, on the back of the fixed holder base.

FIG. 4A is an angled view of a movable hook assembly according to an embodiment of the present invention. In FIG. 4A, hook 30 is arranged at the top area of the front of adjustable hook assembly 70.

FIG. 4B is an angled view of safety hook, security hook or earthquake hook latch 72 according to an embodiment of the present invention. The safety hook, security hook or earthquake hook latch 72 securely attaches to adjustable hook assembly 70 in a manner to inhibit removal of the hanging device of the object from the hook portion of adjustable hook assembly 70.

Figure 4C:
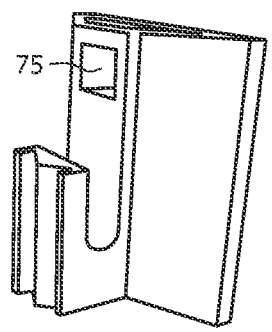
FIG. 4C is a perspective view of a movable hook assembly with a recess according to an embodiment of the present invention.

FIG. 4C is an angled view of an adjustable hook assembly with a recess 75 for engaging with a safety hook, security hook, or earthquake hook, latch of FIG. 4B according to an embodiment of the present invention.

Figure 4D:
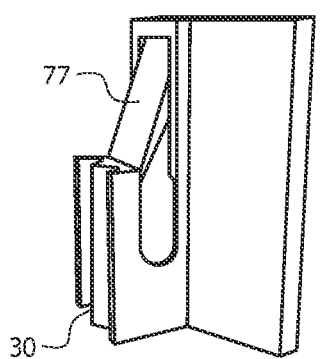
FIG. 4D is a perspective view of a movable hook apparatus with an integral safety hook, security hook or earthquake hook latch according to an embodiment of the present invention.

FIG. 4D is a perspective view of a movable hook apparatus with an integral safety hook, security hook or earthquake hook latch 77 according to an embodiment of the present invention.

Figure 4E:
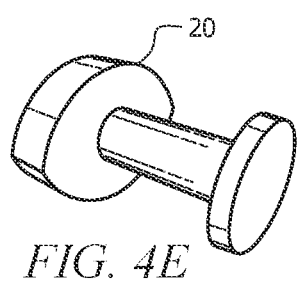
FIG. 4E is a perspective view of an actuator used in an embodiment of the present invention.

FIG. 4E is a perspective view of an actuator 20 used in an embodiment of the present invention.

Figure 4F:
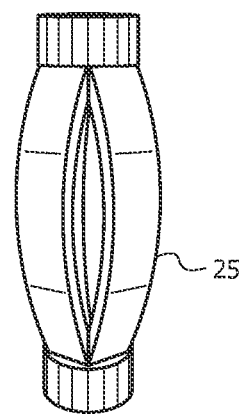
FIG. 4F is a perspective view of a spring actuator used in an embodiment of the present invention.

FIG. 4F is a perspective view of a spring actuator 25 used in an embodiment of the present invention. The spring actuator 25 used in lieu of a threaded actuator is used to manipulate the position of the adjustable hook assembly within the base cavity of the various embodiments. Spring actuator 25 is manipulable by hand by the user to adjust the hook assembly vertically or horizontally in relation to the base as described herein.

Such mounting bracket in one embodiment includes a series of holes or slots for receiving a nail or hook attached to the fixed holder base or an integral hook on the rear of the fixed holder base. In an alternative embodiment, an attachment that hooked into the nail hole of the fixed holder base from the back of the fixed holder base and then could be inserted into the mounting bracket. This allows for a horizontal adjustment of the adjustable holder assembly.

With such an arrangement, the movable hook apparatus and fixed holder base is adjusted horizontally, with respect to the mounting bracket. In some embodiments, the horizontal rails have a cross-section, and the horizontal receiving grooves have a corresponding cross-section that is complementary to and configured to receive the horizontal rails.

The horizontal rails have a substantial circular cross-section, an inverted triangular cross-section, an inverted trapezoidal cross-section, or the like.

The movable hook apparatus front wall includes a hanger 30 formed on the outer surface. The hanger can be in the form of a post, a pivotable post, a pin, a knob, a hook, a double hook, combinations thereof, or the like.

In some embodiments, hanger 30 is in the form of an at least partially round protrusion extending from the movable hook apparatus front wall. The round protrusion has a shoulder, for example, at a distal end thereof. Between the shoulder and the movable hook apparatus front wall a hanger groove is defined, for example, between the shoulder of the hanger and the front wall of the movable hook apparatus. In some embodiments, the hanger assembly further comprises a hook plate. The hook plate comprises an outer surface, an inner surface, a top end, a bottom end, and a hook mounted or otherwise secured or formed as part of the outer surface. The bottom end of the hook plate includes a clip, for example, to engage a recess in the movable hook apparatus. The inner surface of the hook plate includes a recess for accommodating a hanger, if a hanger exists on the movable hook apparatus. The inner surface of the hook plate includes one or more additional recesses, for example, a recess to accommodate a plurality of gripping ridges formed on the outer surface of the movable hook apparatus. In some embodiments, the movable hook apparatus is be flat on a front surface thereof, such that it does not include a hanger, and the inner surface of the hook plate is, therefore, flat and need not include a recess for accommodating a hanger.

The different components of the various embodiments of the adjustable hangar assembly described herein are provided together as a kit, for example, disassembled. In use, movable hook apparatus 70 is slidingly engaged in cavity 10 of rectangular fixed holder base 80.

When rectangular fixed holder base 80 is mounted to a wall or engaged with a mounting bracket mounted on a wall, the relative height of the adjustable hanger assembly is vertically adjusted. Vertical adjustment is made with a single finger or thumb to turn or manipulate the actuator, without the need for tools. In the alternative, the head of the actuator has a slot for manipulation with a screwdriver or a hex wrench or other suitable tool.

The actuator in one embodiment is provided separately and then installed in the fixed holder base or pre-connected to the fixed holder base, for example, inserted into slots, riveted, welded, integrally-molded, or otherwise formed with, or as part of, the fixed holder base.

The actuator is comprised of a metal material, a plastic/polymer material, or the like. Other actuator types such as coiled springs are used. Deformable foams and plastics can be used, for example, such as elastically deformable closed-cell foams.

According to various embodiments, the movable hook apparatus front wall 30 has an outer surface and a hook formed on such outer surface.

A particular advantage of the present invention is the ability of the hook to be raised to a height that is above the height of the fixed holder base and above the height of the mounting bracket. The fixed holder base, mounting bracket, or both, can have respective top edges, and the top of the movable hook apparatus, including the top of the hook, can extend above the top surface of the fixed holder base, mounting bracket, or both. With such a feature, no part of the assembly shows behind an object, or frame, or behind an object hung by the assembly.

While the disclosed embodiments have been described with reference to one or more particular implementations, these implementations are not intended to limit or restrict the scope or applicability of the invention. Those having ordinary skill in the art will recognize that many modifications and alterations to the disclosed embodiments are available. Therefore, each of the foregoing embodiments and obvious variants thereof is contemplated as falling within the spirit and scope of the disclosed inventions.

While the invention has been particularly shown and described with reference to a preferred embodiment, it will be understood by those skilled in the art that various changes in form and detail can be made therein without departing from the spirit and scope of the invention.

Additional Description

The following clauses are offered as further description of the disclosed invention.

Clause 1. An adjustable hanger, comprising:
 a. a mountable base having a cavity and a lower side having an aperture;
 b. a hook assembly for slidable insertion into the cavity, having a hook and a lower face; and
 c. a rotatable actuator for insertion into the aperture and in contact with the lower face of the hook assembly, wherein the hook assembly is positionable at multiple locations within the cavity according to a position of the rotatable actuator within the aperture.

Clause 2. The adjustable hanger of any proceeding or preceding claim, further comprising at least one mounting hole in a back panel of the mountable base.

Clause 3. The adjustable hanger of any proceeding or preceding claim, wherein the actuator is threaded.

Clause 4. The adjustable hanger assembly of any proceeding or preceding claim, wherein the actuator is a spring clip.

Clause 5. The adjustable hanger assembly of any proceeding or preceding claim, wherein the cavity is along a longitudinal axis of the mountable base.

Clause 6. The adjustable hanger assembly of any proceeding or preceding claim, wherein the hook assembly is movable vertically within the cavity in relation to the mountable base.

Clause 7. The adjustable hanger assembly of any proceeding or preceding claim, wherein the hook assembly is positionable at multiple vertical locations within the cavity according to a position of the rotatable actuator within the aperture.

Clause 8. The adjustable hanger assembly of any proceeding or preceding claim, wherein the hook assembly is movable laterally within the cavity in relation to the mountable base.

Clause 9. A horizontally and vertically adjustable hanging assembly, comprising:
 a. a vertically adjustable hook assembly, comprising:
 b. a horizontally slidable hanger body having a longitudinal cavity and a lower side;
 c. an aperture disposed in the lower side of the horizontally slidable hanger body;
 d. an actuator for insertion into the aperture;
 e. a first hook disposed on an outer side of the horizontally slidable hanger body and insertable in the longitudinal cavity;
 f. a second hook disposed on an upper side of the horizontally slidable hanger body; and
 g. a mountable base having a channel spanning at least partially along the width of the base, wherein the profile of the channel corresponds to the profile of the second hook for slidably positioning the horizontally slidable hangar body horizontally along the channel.

Clause 10. The horizontally and vertically adjustable hanging assembly of any proceeding or preceding claim, wherein the actuator is rotatable.

Clause 11. The horizontally and vertically adjustable hanging assembly of any proceeding or preceding claim, wherein the first hook is positioned within the longitudinal cavity according to a position of the actuator.

Clause 12. The horizontally and vertically adjustable hanging assembly of any proceeding or preceding claim, wherein the first hook is positioned within the longitudinal cavity according to a position of the rotatable actuator within the aperture.

Clause 13. The horizontally and vertically adjustable hanging assembly of any proceeding or preceding claim, wherein the channel further comprises one or more grooves for receipt of the second hook.

Clause 14. The adjustable hanger of any proceeding or preceding claim, wherein the actuator is threaded.

Clause 15. The adjustable hanger assembly of any proceeding or preceding claim, wherein the actuator is a spring clip.

Clause 16. A method of hanging an object on a substantially planar structure; comprising:
  a. mounting a base having cavity on the substantially planar structure;
  b. slidably inserting a hook body having a lower face into the cavity;
  c. manipulating in a first direction an actuator inserted through an aperture in a lower side of the base and in contact with the lower face of the hook body causing the hook body to move in a first direction within the cavity; and
  d. manipulating in a second direction the actuator inserted through an aperture in the lower side of the base and in contact with the lower face of the hook body causing the hook body to move in a second direction within the cavity.

Clause 17. The method of any proceeding or preceding claim, wherein manipulation in the first direction of the actuator causes the hook body to move in an upward direction in relation to the base.

Clause 18. The method of any proceeding or preceding claim, wherein manipulation in the second direction of the actuator causes the hook body to move in a downward direction in relation to the base.

Clause 19. The method of any proceeding or preceding claim, wherein manipulation in the first direction of the actuator causes the hook body to move in a first lateral direction in relation to the base.

Clause 20. The method of any proceeding or preceding claim, wherein manipulation in the first direction of the actuator causes the hook body to move in a second lateral direction in relation to the base.

What is claimed is:

1. An adjustable hanger, comprising:
  a mountable base having a cavity and a lower side having an aperture;
  a hook assembly for slidable insertion into the cavity, having a hook and a lower face; and
  a rotatable actuator for insertion into the aperture and in contact with the lower face of the hook assembly,
  wherein the hook assembly is positionable at multiple locations within the cavity according to a position of the rotatable actuator within the aperture,
  wherein the actuator is a spring clip.

2. The adjustable hanger of claim 1, further comprising at least one mounting hole in a back panel of the mountable base.

3. The adjustable hanger assembly of claim 1, wherein the cavity is along a longitudinal axis of the mountable base.

4. The adjustable hanger assembly of claim 3, wherein the hook assembly is movable vertically within the cavity in relation to the mountable base.

5. The adjustable hanger assembly of claim 4, wherein the hook assembly is positionable at multiple vertical locations within the cavity according to a position of the rotatable actuator within the aperture.

6. The adjustable hanger assembly of claim 1, wherein the hook assembly is movable laterally within the cavity in relation to the mountable base.

7. A horizontally and vertically adjustable hanging assembly, comprising:
  a vertically adjustable hook assembly, comprising:
    a horizontally slidable hanger body having a longitudinal cavity and a lower side;
    an aperture disposed in the lower side of the horizontally slidable hanger body;
    an actuator for insertion into the aperture;
    a first hook disposed on an outer side of the horizontally slidable hanger body and insertable in the longitudinal cavity;
    a second hook disposed on an upper side of the horizontally slidable hanger body; and
  a mountable base having a channel spanning at least partially along the width of the base, wherein the profile of the channel corresponds to the profile of the second hook for slidably positioning the horizontally slidable hangar body horizontally along the channel.

8. The horizontally and vertically adjustable hanging assembly of claim 7, wherein the actuator is rotatable.

9. The horizontally and vertically adjustable hanging assembly of claim 7, wherein the first hook is positioned within the longitudinal cavity according to a position of the actuator.

10. The horizontally and vertically adjustable hanging assembly of claim 7, wherein the first hook is positioned within the longitudinal cavity according to a position of the rotatable actuator within the aperture.

11. The horizontally and vertically adjustable hanging assembly of claim 7, wherein the channel further comprises one or more grooves for receipt of the second hook.

12. The adjustable hanger of claim 7, wherein the actuator is threaded.

13. The adjustable hanger assembly of claim 7, wherein the actuator is a spring clip.

14. A method of hanging an object on a substantially planar structure; comprising:
  mounting a base having cavity on the substantially planar structure;
  slidably inserting a hook body having a lower face into the cavity;
  manipulating in a first direction an actuator inserted through an aperture in a lower side of the base and in contact with the lower face of the hook body causing the hook body to move in a first direction within the cavity; and
  manipulating in a second direction the actuator inserted through an aperture in the lower side of the base and in contact with the lower face of the hook body causing the hook body to move in a second direction within the cavity, wherein manipulation in the first direction of the actuator causes the hook body to move in a first lateral direction in relation to the base.

15. The method of claim 14, wherein manipulation in the first direction of the actuator causes the hook body to move in an upward direction in relation to the base.

16. The method of claim 15, wherein manipulation in the first direction of the actuator causes the hook body to move in a second lateral direction in relation to the base.

17. The method of claim 15, wherein manipulation in the second direction of the actuator causes the hook body to move in a downward direction in relation to the base.

\* \* \* \* \*